United States Patent Office 2,960,521
Patented Nov. 15, 1960

2,960,521

REACTION PRODUCTS OF POLYETHYLENE OXIDE WAX, HIGH MOLECULAR WEIGHT ALCOHOLS AND POLYBASIC ACIDS

Rudi Heyden, Dusseldorf, Germany, assignor to Bohme Fettchemie G.m.b.H., Dusseldorf, Germany, a corporation of Germany No Drawing. Filed June 24, 1954, Ser. No. 439,143

Claims priority, application Germany June 25, 1953

9 Claims. (Cl. 260—461)

This invention relates to emulsifying agents and methods of producing the same as well as to emulsions made with such agents.

A great number of emulsifying agents are known but the majority of them, while being capable of producing homogeneous emulsions, do not prevent the emulsions from decomposing and separating during extended periods of storage, particularly when the emulsion contains certain quantities of electrolyte.

It is an object of the present invention to provide a series of novel emulsifying agents.

Another object of this invention is to provide emulsifying agents which render emulsions made therewith highly stable against decomposition and separation, particularly in the presence of an electrolyte.

Other objects and advantages will become apparent as the description of this invention proceeds.

I have found that valuable emulsifying agents can be produced if polyalkylene waxes are condensed with high-molecular aliphatic, cycloaliphatic or fatty aromatic hydroxyl compounds and tri- or higher polycarboxylic organic acids or tri- or higher polybasic inorganic acids. The condensation products obtained in this manner are wax-like products which are soluble in water and, as emulsifiers, form highly stable emulsions in water as well as in other types of solvents.

The polyalkylene waxes in question include primarily polyethylene oxide waxes, obtained by polymerizing ethylene oxide, which have a molecular weight of at least 1000 and preferably molecular weight between 5000 and 10,000. Instead of these polyethylene oxide waxes, corresponding polymerization products of other alkylene oxides, for example those of propylene oxide, may be used.

Among the high-molecular hydroxyl compounds which may be used are primarily the high-molecular fatty alcohols having at least 6 carbon atoms in the molecule; also naphthene alcohols, resinous alcohols, cyclohexyl alcohols, alkylated cyclohexyl alcohols, alkylphenols and alkylnaphthols (the alkyl radical containing from 3 to 18 carbon atoms), and the like, are particularly suitable. The tri- and higher polycarboxylic acids which may be used include citric acid, aconitic acid, diadipic acid, 1,2; 3,4-butane-tetracarboxylic acid, mesitic acid, mellitic acid, nitrilo-triacetic acid, ethylene-dinitrilo-tetraacetic acid, and the like. Examples of inorganic polybasic acids are boric acid and phosphoric acid.

In order to produce the emulsifiers of my invention, all of the starting materials are mixed together and then heated to temperatures between 60 and 180° C., preferably in a vacuum; if necessary, esterification catalysts, such as toluene sulfonic acid, are added. In certain instances the acids may be replaced by derivatives thereof, in particular their halides, esters or anhydrides. The phosphoric acids and their derivatives which are suitable for the condensation in accordance with this invention include primarily the well-known ortho-phosphoric acid, as well as chlorides of phosphorus, such as phosphorus oxychloride or phosphorus trichloride. Phosphorus pentoxide is also suitable for this purpose.

Furthermore, the reaction can be carried out in certain instances in the presence of inert solvents, such as benzene. The reaction may also be carried out in separate, step-wise reactions by first reacting the polyalkylene wax with the acid or its derivatives and subsequently reacting the product thus formed with the hydroxyl compound.

The quantitative ratios in which the starting materials may be reacted with each other are variable. If the ratio of polyalkylene wax to hydroxyl compound to tri-basic acid is 1:1:1, the reaction products obtained are relatively high-molecular compounds. However, the reaction may also be carried out with larger component parts of hydroxyl compounds or acids, for example with a ratio of polyalkylene wax to hydroxyl compound to tri-basic acid of 1:4:2. Depending upon the ultimate use, therefore, it is possible to produce products having a wide range of relatively high molecular weights. The emulsifying agents of very high molecular weight produced in accordance with this invention are marked by the highly viscous solutions which they form in water. In place of the high-molecular hydroxyl compounds, other high-molecular compounds may also be used, particularly those which contain a readily exchangeable hydrogen atom, for example the high-molecular amines or mercaptans corresponding to the above-described hydroxyl compounds, as well as the corresponding carboxylic acid amides or sulfonic acid amides. The high-molecular hydrocarbon radicals of these compounds should contain at least 6 carbon atoms.

The emulsifying agents in accordance with this invention can be advantageously used for the production of dispersions, i.e. emulsions or suspensions, of many well-known emulsifiable substances. The dispersions produced thereby are very stable, particularly against the effects of neutral, acid or alkaline electrolytes of all types.

Thus, dispersions produced with the aid of the above condensation products may contain substantial amounts of inorganic or organic neutral, acid or to a certain extent also alkaline electrolytes without running the risk of the dispersion being destroyed during extended periods of storage, provided the above-mentioned condensation products are used as dispersion agents.

Emulsifiable or suspendable liquid or solid substances which can be dispersed with the aid of the emulsifying agents of this invention are mineral, animal, vegetable or synthetic oils, fats or waxes, as well as natural or synthetic resin oils or resins, natural or synthetic rubber, albumins, synthetic high-polymer compounds such as polyvinyl compounds, polyesters, polyamides, and the like; inorganic or organic pigments such as color pigments, tarnishing agents, textile weighting agents, fillers as well as solids, powdered additives of all types may also be dispersed with these emulsifying agents to form stable dispersions.

The emulsifiers of the invention are of particular practical interest in the production of salt-containing dispersions of synthetic resins, starch, cellulose derivatives, fatty materials and the like, such as those used in flameproofing, filling or weighting of textiles, wood and the like, or in other impregnating processes which employ electrolyte-containing emulsions; also for the production of tanning oil emulsions which, in addition to fatty materials, contain considerable amounts of chromium and aluminum salts and sodium chloride, and in the production of dispersions of pest control agents in inorganic salt solutions and the like.

The following examples are given for the purpose of further illustrating my invention and without limiting my invention thereto.

Example I 187 parts by weight of polyethylene oxide wax having a molecular weight of about 9300, 7.6 parts by weight of dehydrated citric acid, and 21.4 parts by weight of stearyl alcohol are heated for 8 hours in vacuum at 115° C., with 1.5 parts by weight of toluenesulfonic acid as a catalyst. After allowing the mass to cool, a hard, wax-like substance is obtained which is capable of being used as an emulsifying agent to form highly stable emulsions.

Example II 187 parts by weight of polyethylene oxide wax having a molecular weight of about 9300 are heated with 21.4 parts by weight of stearyl alcohol and 7.88 parts by weight of nitrilo-triacetic acid for 6 hours at 180° C. under reduced pressure. The reaction product is a solid, wax-like mass, which when used as an emulsifying agent forms a highly stable emulsion.

Example III

A paste is made from 38 parts by weight of spindle oil ($E^0_{20}=5—6$), 34 parts by weight of olein sulfonate and 24 parts by weight of an emulsifier prepared in accordance with Example I. 100 parts by weight of this paste are mixed with 500 parts by volume of a salt solution containing 132 gm./l. sodium chloride and 58 gm./l. commercial 33% basic chromium tanning salt (25% $Cr_2O_3$ content). The result is a very stable fatty emulsion which is suitable for brush tanning and greasing.

Example IV

A paste is made from spindle oil and olein sulfonate as in Example III, but the emulsifier added was produced by a condensation reaction of 1 mol polyethylene oxide wax (mol. wt. 9300), 1 mol diadipic acid and 1 mol of an alkylsulfamide whose alkyl radical contains from 12 to 16 carbon atoms. The paste thus produced was employed in the manner disclosed in Example III to form a highly stable chromium tanning emulsion.

Example V 116 parts by weight of polyethylene oxide wax having an average molecular weight of about 9300 are heated for 6 hours at 170° C. under reduced pressure with 8.75 parts by weight of stearyl alcohol and 7.6 parts by weight of the reaction product resulting from heating oleic acid and maleic acid anhydride for 6 to 8 hours at 250° C. The resulting product obtained thereby is a wax-like mass which forms a viscous water solution having excellent emulsifying and dispersing properties and forms highly stable dispersions.

Example VI 5 parts by weight of the emulsifying agent obtained in accordance with Example V are dissolved in 95 parts by weight of whale oil which had been sulfonated with 20% sulfuric acid and neutralized with caustic soda (total fat content of the sulfonate: about 75%). Aqueous emulsions produced with this mixture are highly stable against decomposition by electrolyte additives. Among others, tanning emulsions can be made with this emulsifying agent which remain stable for long periods of time. For example, with the aid of such emulsifiers an emulsion which is stable for long periods of time can be produced from 50 gm. sodium chloride, 20 gm. commercial 33% basic chromium tanning salt and 80 gm. fat per liter.

Example VII 187 parts by weight of a polyethylene oxide wax having a molecular weight of 9300 were melted. Into this molten wax 1.42 parts by weight of phosphorus pentoxide and 5.36 parts by weight of stearyl alcohol were stirred. The temperature of the dispersion was then raised to 120° C. and the pressure was simultaneously reduced to about 11 mm. After heating this mixture for about 8 hours, a weakly colored, solid, water-soluble wax was obtained. In 53 parts by weight of water, 2 parts by weight of the reaction product of 1 mol octadecyl alcohol and 12 mols ethylene oxide and 3 parts by weight of the above wax were dissolved, and then 40 parts by weight of paraffinic oil were emulsified in this solution. A viscous emulsion was obtained which was highly stable in the presence of an electrolyte.

Example VIII

A mixture of 38 parts by weight of spindle oil having a viscosity of 5—6 $E^0_{20}$, 34 parts by weight of sulfonated olein (obtained by sulfonating olein with 20% of 96% sulfuric acid) are mixed with 24 parts by weight of an emulsifier, produced from polyethylene oxide wax (molecular weight 7500), phosphorus oxychloride and dodecylalcohol in a quantitative ratio of 1:1:1, and cooled to room temperature while stirring. A paste was thus formed. 1 part by weight of this paste was mixed with 2 parts by weight of a chromium tanning solution which contained 70 gm. sodium chloride and 36 gm. of commercial 33% basic chromium tanning salt (with a chromium oxide content of 25%) per liter of solution. A highly stable emulsion was obtained which was used for tanning pelt skins.

Example IX

In 55 parts by weight of water, 7.5 parts by weight of a dispersing agent are dissolved, the agent being produced by reacting a polyethylene oxide wax (molecular weight 9300) with phosphorus oxychloride at a molar ratio of 1:1 and subsequent reaction of the reaction product with 1 mol of dodecyl-benzene sulfamide. Into this solution 28 parts by weight of chloroparaffine and 2.5 parts by weight of Decalin are first stirred and then 7.0 parts by weight of finely pulverized chromium oxide are added. The emulsion thus obtained is highly stable in the presence of an electrolyte and may be used as agent for making inflammable textiles.

While I have given several illustrative examples of the practice of my invention, it will be understood that the invention may be practiced in other ways and that various modifications and changes may be made in the examples given without departing from the spirit of my invention or the scope of the following claims.

I claim:

1. A process for the production of emulsifying agents which comprises subjecting (1) a polyethylene oxide wax having a molecular weight between 1000 and 10,000 to a condensation reaction at a temperature between 60° and 180° C. with (2) an organic compound selected from the group consisting of a high molecular mono-hydroxy alcohol selected from the group consisting of saturated higher alkanols containing at least 6 carbon atoms in the molecule, naphthene alcohols, resinous alcohols, cyclohexyl alcohols, and alkylated cyclohexyl alcohols, alkylphenols and alkylnaphthols wherein the alkyl radical contains from 3 to 18 carbon atoms, and sulfamides selected from the group consisting of alkyl and alkyl benzene sulfamides and (3) a polybasic acid compound having from three to six acid groups selected from the group consisting of boric and phosphoric acids, their halides and anhydrides, aliphatic carboxylic acids having at least three carbon atoms in the aliphatic chain, and benzene carboxylic acids, in quantitative ratios between one part polyethylene oxide wax to one part organic compound to one part acid compound, and one part polyethylene oxide wax to four parts organic compound to two parts acid compound.

2. A process for the production of emulsifying agents which comprises subjecting (1) a polyethylene oxide wax having a molecular weight between 1000 and 10,000 to a condensation reaction at a temperature between 60° and 180° C. with (2) an organic compound selected from the group consisting of a high molecular mono-hydroxy alcohol selected from the group consisting of saturated higher alkanols, containing at least 6 carbon atoms in the molecule, naphthene alcohols, resinous alcohols, cyclohexyl alcohols, and alkylated cyclohexyl alcohols, alkylphenols and alkylnaphthols wherein the alkyl radical contains from 3 to 18 carbon atoms, and sulfamides selected from the group consisting of alkyl and alkyl benzene sulfamides, said organic compound having between 6 and 28 carbon atoms in its molecule, and (3) a polybasic acid compound having from three to six acid groups selected from the group consisting of boric and phosphoric acids, their halides and anhydrides, aliphatic carboxylic acids having at least three carbon atoms in the aliphatic chain, and benzene carboxylic acids, in quantitative ratios between one part polyethylene oxide wax to one part organic compound to one part acid compound, and one part polyethylene oxide wax to four parts organic compound to two parts acid compound.

3. A process for the production of emulsifying agents which comprises subjecting (1) a polyethylene oxide wax having a molecular weight between 5000 and 10,000 to a condensation reaction at a temperature between 60° and 180° C. with (2) an organic compound selected from the group consisting of a high molecular mono-hydroxy alcohol selected from the group consisting of saturated higher alkanols, containing at least 6 carbon atoms in the molecule, naphthene alcohols, resinous alcohols, cyclohexyl alcohols, and alkylated cyclohexyl alcohols, alkylphenols and alkylnaphthols wherein the alkyl radical contains from 3 to 18 carbon atoms, and sulfamides selected from the group consisting of alkyl and alkyl benzene sulfamides, said organic compound having between 6 and 28 carbon atoms in its molecule, and (3) a polybasic acid compound having from three to six acid groups selected from the group consisting of boric and phosphoric acids, their halides and anhydrides, aliphatic carboxylic acids having at least three carbon atoms in the aliphatic chain and benzene carboxylic acids in quantitative ratios between one part polyethylene oxide wax to one part organic compound to one part acid compound, and one part polyethylene oxide wax to four parts organic compound to two parts acid compound.

4. A process for the production of emulsifying agents which comprises subjecting (1) a polyethylene oxide wax having a molecular weight between 1000 and 10,000 to a condensation reaction at a temperature between about 60° and 180° C. with (2) an organic compound selected from the group consisting of a high molecular mono-hydroxy alcohol selected from the group consisting of saturated higher alkanols containing at least 6 carbon atoms in the molecule, naphthene alcohols, resinous alcohols, cyclohexyl alcohols, and alkylated cyclohexyl alcohols, alkylphenols and alkylnaphthols wherein the alkyl radical contains from 3 to 18 carbon atoms, and sulfamides selected from the group consisting of alkyl and alkyl benzene sulfamides, and (3) phosphorus pentoxide in quantitative ratios between one part polyethylene oxide wax to one part organic compound to one part phosphorus pentoxide, and one part polyethylene oxide wax to four parts organic compound to two parts phosphorus pentoxide.

5. A process for the production of emulsifying agents which comprises subjecting (1) a polyethylene oxide wax having a molecular weight between 1000 and 10,000 to a condensation reaction at a temperature between about 60° and 180° C. with (2) an organic compound selected from the group consisting of a high molecular mono-hydroxy alcohol selected from the group consisting of saturated higher alkanols containing at least 6 carbon atoms in the molecule, naphthene alcohols, resinous alcohols, cyclohexyl alcohols, and alkylated cyclohexyl alcohols, alkylphenols and alkylnaphthols wherein the alkyl radical contains from 3 to 18 carbon atoms, and sulfamides selected from the group consisting of alkyl and alkyl benzene sulfamides, and (3) phosphorus oxychloride in quantitative ratios between one part polyethylene oxide wax to one part organic compound to one part phosphorus oxychloride, and one part polyethylene oxide wax to four parts organic compound to two parts phosphorus oxychloride.

6. A process for the production of emulsifying agents which comprises subjecting (1) a polyethylene oxide wax having a molecular weight between 1000 and 10,000 to a condensation reaction at a temperature between about 60° and 180° C. with (2) an organic compound selected from the group consisting of a high molecular mono-hydroxy alcohol selected from the group consisting of saturated higher alkanols, containing at least 6 carbon atoms in the molecule, naphthene alcohols, resinous alcohols, cyclohexyl alcohols, and alkylated cyclohexyl alcohols, alkylphenols and alkylnaphthols wherein the alkyl radical contains from 3 to 18 carbon atoms, and sulfamides selected from the group consisting of alkyl and alkyl benzene sulfamides, and (3) citric acid in quantitative ratios between one part polyethylene oxide wax to one part organic compound to one part citric acid and one part polyethylene oxide wax to four parts organic compound to two parts citric acid.

7. A process for the production of emulsifying agents which comprises subjecting (1) a polyethylene oxide wax having a molecular weight between 1000 and 10,000 to a condensation reaction at a temperature between about 60° and 180° C. with (2) an organic compound selected from the group consisting of a high molecular mono-hydroxy alcohol selected from the group consisting of saturated higher alkanols, containing at least 6 carbon atoms in the molecule, naphthene alcohols, resinous alcohols, cyclohexyl alcohols and alkylated cyclohexyl alcohols, alkylphenols and alkylnaphthols wherein the alkyl radical contains from 3 to 18 carbon atoms, and sulfamides selected from the group consisting of alkyl and alkyl benzene sulfamides, and (3) diadipic acid in quantitative ratios between one part polyethylene oxide wax to one part organic compound to one part diadipic acid, and one part polyethylene oxide wax to four parts organic compound to two parts diadipic acid.

8. As an article of manufacture, an emulsifying agent which is the result of a condensation reaction at a temperature between 60° and 180° C. between (1) a polyethylene oxide wax having a molecular weight between 1000 and 10,000, (2) an organic compound selected from the group consisting of a high molecular mono-hydroxy alcohol selected from the group consisting of saturated higher alkanols, containing at least 6 carbon atoms in the molecule, naphthene alcohols, resinous alcohols, cyclohexyl alcohols, and alkylated cyclohexyl alcohols, alkylphenols and alkylnaphthols wherein the alkyl radical contains from 3 to 18 carbon atoms, and sulfamides selected from the group consisting of alkyl and alkyl benzene sulfamides and (3) a polybasic acid compound having from three to six acid groups selected from the group consisting of boric and phosphoric acids, their halides and anhydrides, aliphatic carboxylic acids having at least three carbon atoms in the aliphatic chain, and benzene carboxylic acids, in quantitative ratios between one part polyethylene oxide wax to one part organic compound to one part acid compound, and one part polyethylene oxide wax to four parts organic compound to two parts acid compound.

9. As an article of manufacture, an emulsifying agent which is the result of a condensation reaction at a temperature between 60° and 180° C. between (1) a polyethylene oxide wax having a molecular weight between 5000 and 10,000, (2) an organic compound selected from the group consisting of a high molecular mono-hydroxy alcohol selected from the group consisting of saturated higher alkanols, containing at least 6 carbon atoms in the molecule, naphthene alcohols, resinous alcohols, cyclohexyl alcohols, and alkylated cyclohexyl alcohols, alkylphenols and alkylnaphthols wherein the alkyl radical contains from 3 to 18 carbon atoms, and sulfamides selected from the group consisting of alkyl and alkyl benzene sulfamides and (3) a polybasic acid compound having from three to six acid groups selected from the group consisting of boric and phosphoric acids, their halides and anhydrides, aliphatic carboxylic acids having at least three carbon atoms in the aliphatic chain, and benzene carboxylic acids, in quantitative ratios between one part polyethylene oxide wax to one part organic compound to one part acid compound, and one part polyethylene oxide wax to four parts organic compound to two parts acid compound.

References Cited in the file of this patent

UNITED STATES PATENTS

| | | |
|---|---|---|
| 2,652,424 | De Groote | Sept. 15, 1953 |
| 2,654,714 | Kirkpatrick | Oct. 6, 1953 |
| 2,677,700 | Jackson et al. | May 4, 1954 |
| 2,755,296 | Kirkpatrick | July 17, 1956 |

OTHER REFERENCES

Kosolapoff: "Organo-Phosphorus Compounds," John Wiley & Sons, Inc., New York (1950), page 220.